United States Patent [19]

Lundsgaard

[11] 4,142,220

[45] Feb. 27, 1979

[54] MULTI ARC GAP SURGE ARRESTER

[75] Inventor: Paul S. Lundsgaard, Chicago, Ill.

[73] Assignee: Reliable Electric Company, Franklin Park, Ill.

[21] Appl. No.: 836,585

[22] Filed: Sep. 26, 1977

[51] Int. Cl.$^2$ ............................................... H02H 3/22

[52] U.S. Cl. .................................... 361/120; 361/119; 361/129; 313/306

[58] Field of Search ............... 361/120, 124, 117, 118, 361/119, 129; 315/35, 36; 313/214, 217, 231.1, 244, 245, 246, 247, 283, 306, 307, 308, 325

[56] References Cited

U.S. PATENT DOCUMENTS

| | | | |
|---|---|---|---|
| 3,448,337 | 1/1969 | Kawiecki | 361/120 X |
| 3,649,874 | 3/1972 | Peche | 361/120 |
| 3,651,380 | 3/1972 | Peche et al. | 361/120 |
| 3,710,191 | 1/1973 | Peche | 361/120 |
| 3,989,985 | 11/1976 | Lange et al. | 361/120 |

FOREIGN PATENT DOCUMENTS

| | | | |
|---|---|---|---|
| 2416945 | 10/1975 | Fed. Rep. of Germany | 315/35 |

*Primary Examiner*—Patrick R. Salce
*Attorney, Agent, or Firm*—Olson, Trexler, Wolters, Bushnell & Fosse, Ltd.

[57] ABSTRACT

A surge arrester of the gas tube type for protecting telephone lines has a primary arc gap and a secondary arc gap electrically coupled in parallel. The primary arc gap is wider than the secondary arc gap and both arc gap are exposed to the inert gaseous medium of the arrester. The gas pressure and the width of the gaps are such that the breakdown voltage of the primary arc gap is less than the breakdown voltage of the secondary arc gap so that in normal operation the arrester discharges through the primary arc gap. However, if the inert gas leaks from the tube and becomes replaced with air at atmospheric pressure, the arrester will discharge through the secondary arc gap to provide a backup protection for the line.

12 Claims, 8 Drawing Figures

MULTI ARC GAP SURGE ARRESTER

BACKGROUND OF THE INVENTION

This invention relates to spark gap devices and particularly the improvements in gas tube surge arresters of the type primarily used for protecting telephone lines and other equipment connected thereto from overvoltage conditions.

Many telephone line protectors, such as station protectors and central office equipment protectors, embody gas tube surge arresters. When a high voltage surge from lightning or a power line is applied to the protected telephone line, a voltage appears across the electrodes of the gas tube causing the gas in the tube to become ionized so that the tube conducts to ground. Sometimes, however, a gas tube fails as a result of leakage of the inert gas in the tube to atmosphere. This can be the result of damage to a tube from mishandling, improper construction, or the like. In any event, when a gas tube fails in this manner it is no longer a suitable line protective device because its breakdown voltage is excessive due to its wide electrode gap, which is then an air gap. Consequently, it has been a common practice to back-up or supplement gas tube arresters with carbon air gap arresters in parallel thereto. Then if the gas tube fails from loss of gas, the telephone line will be protected through the carbon air gap arrester.

However, where a gas tube surge arrester and a carbon air gap surge arrester are both used the cost of line protection increases substantially. Moreover, in most instances the gas tube does function properly and the carbon air gap arrester is really superfluous. Where there is an extremely fast rise in the surge rate on the line, it usually happens that the carbon arrester discharges first; the gas tube may not even fire at all. If there are frequent instances of a rapidly rising surge rate on the line, the life of the gas tube/carbon arrester combination will in effect be dependent upon the life carbon arrester unit, which is much less than that of the gas tube arrester. Thus, in attempting to utilize the dual protection of a gas tube arrester and a carbon air gap arrester the carbon arrester may actually be the primary functioning protector until it shorts out, following which the gas tube arrester serves no useful purpose unless the carbon arrester is removed. Therefore, combination gas tube/carbon arrester units may tend to defeat the purpose of gas tube protection.

The relationship between breakdown or ionization voltage, electrode spacing and gas pressure is known. According to Paschen's law, for a given cathode surface material and type of gas, the breakdown voltage is a function only of the mathematical product of the gas pressure p and the interelectrode spacing d and not upon these two parameters separately. For electrodes of a given area the volume of gas contained between them is proportional to the interelectrode spacing d. Since the concentration of gas molecules is proportional to the pressure, the value pd is proportional to the number of molecules between the electrodes. Thus, from Paschen's law the ionization voltage depends only upon the total number of molecules of gas between the electrodes for any particular cathode material and gas.

Again, considering a particular gas and particular pair of electrodes, a curve can be plotted of ionization or breakdown voltage as a function of pd. Such a curve will show that very high ionization voltages are required for very high values of pd and for very low values of pd as well. At the low point on the curve there will be a value of pd at which the ionization voltage will be a minimum. The reason for the presence of this minimum pd point in the curve is apparent. Assume, for example, that the interelectrode spacing d is fixed and the pressure p may be varied. At low gas pressures there are only a small number of gas molecules present. The mean free path between the gas molecules is relatively large and so the number of electron collisions that cause gas ionization is relatively small. Consequently, in order to increase the energy of the electrons to a high enough level to produce ionization, a sufficiently high voltage must be applied. On the other hand, where the gas pressure is high the number of electron collisions is quite large and the energy gained by each electron per mean free path is small unless the applied voltage is high. For ionization to take place, the energy per mean free path must exceed a certain minimum amount, namely the ionization potential of the gas, and so a high potential will be necessary. Between the extremes of high pressure will be a gas pressure for a minimum ionization potential.

OBJECTS AND SUMMARY OF THE INVENTION

An object of this invention is to provide a surge arrester of the gas tube type which is constructed with dual arc gaps so arranged that when the gas tube is functioning normally the discharge will be through the primary arc gap but not the secondary gap. However, should the gas tube be vented to atmosphere due to leakage, the surge arrester can serve a line protecting function via an arc to ground across the secondary arc gap because the smaller arc gap now has a lower breakdown voltage than it did when the tube was filled with gas. For purposes of this invention the gas tube is filled with inert gas. The gas pressure and width of the secondary gap are such that the secondary gap breaks down at a higher voltage under the applied gas pressure than under the atmospheric pressure to which the secondary gap is exposed when the gas tube comes vented. A surge arrester with an operation as just described is possible because of Paschen's law.

In accordance with the invention a spark gap device comprises means forming a chamber, a first pair of opposed electrode surfaces defining a primary arc gap in said chamber, a second pair of electrode surfaces forming a secondary arc gap in said chamber, the width of said primary arc gap being greater than the width of said secondary arc gap, said primary and secondary arc gaps being electrically coupled in parallel, an ionizable gaseous medium in said chamber, the pressure of said gaseous medium and the widths of said gaps being such that the breakdown voltage of the primary arc gap is less than the breakdown voltage of the secondary arc gap, but the breakdown voltage of the secondary arc gap becomes less than the breakdown voltage of the primary arc gap upon loss of said gaseous medium from the chamber and replacement thereof in the chamber with air at atmospheric pressure.

A further object of this invention is to provide a multiple arc gap arrester which eliminates the need for a carbon air gap surge arrester to supplement a gas tube surge arrester.

DETAILED DESCRIPTION

Figure 1:
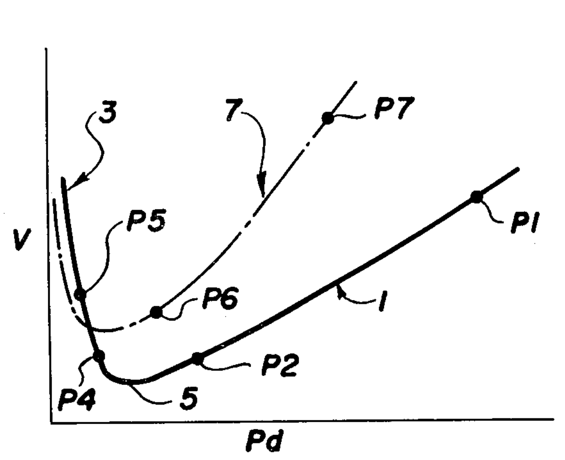
FIG. 1 is a graph showing curves (not to scale) of breakdown voltage as a mathematical product of gas pressure and interelectrode spacing and utilized to explain certain principles of the present invention.

Referring more particularly to FIG. 1 there is shown in full lines an approximate curve of ionization or breakdown voltage V as a function of gas pressure p times interelectrode spacing d, i.e., the mathematical product pd. It will be seen that for high values of pd for example, as indicated along curve portion 1, the breakdown voltage is rather high and increases for increasing values of pd. Also, for very low values of pd, for example, as along curve portion 3, the breakdown voltage is also rather high and increases for decreasing values of pd. The low point 5 of the curve represents the minimum breakdown voltage for the particular gas (e.g., argon, helium, neon or other suitable gas) and electrode material in connection with which the solid line curve is plotted.

By way of example, the gas tube surge arrester of the invention may utilize electrodes of Kovar. The inert gas may be argon. Kovar is a known alloy of about 54% iron, 28% nickel and 18% cobalt. The argon may be in the arrester at a pressure of 3mm. of Hg. It has been found that at the approximate low point 5 for argon at a pressure of 10mm of Hg., the gap is 0.015 inches and the breakdown voltage is about 220 volts.

Assume, for example, that at P1 there is an ionization voltage of 1200 volts for a particular pd combination. If either the gas pressure p or the arc gap d or both are decreased, the ionization voltage V could be reduced, for example, to about 300 to 400 volts at P2. The portion of the curve indicated by 1, i.e., containing the points P1, P2 is roughly linear and represents the region at which currently available gas tubes operate. To the left of the Paschen low point 5, namely the portion of the curve indicated at 3, the breakdown voltage increases with decreasing arc gap spacing d, assuming a constant gas pressure p.

It is possible to find a point P4 where the ionization voltage V is the same as for P2. In fact point P5 can be found with a breakdown voltage that will be much higher than the breakdown voltages at P2 and P4 even though the interelectrode spacing d is substantially less than at P2 or P4, again assuming a constant gas pressure. For example, the gap d may be narrowed so that at P5 the breakdown voltage is about 800 volts.

Figure 2:
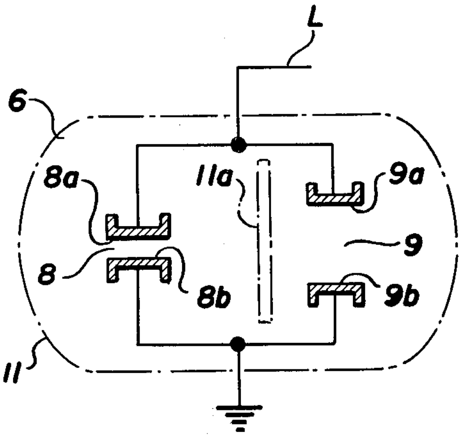
FIG. 2 is a schematic of a form of the invention.

In a form of the invention shown in FIG. 2 an arrester may be constructed with a chamber 6 that contains a primary arc gap 9 and a secondary arc gap 8, coupled in electrical parallel, and for example utilizing Kovar as the electrode surfaces 8*a*, 8*b*, 9*a*, 9*b* and argon as the gaseous medium in the chamber 6. The chamber 6 may be formed by any conventional means such as a glass vacuum container, diagramatically indicated at 11. If necessary, the gaps 8, 9 may be isolated from each other by any suitable insulator schematically indicated at 11*a* so as to prevent material erupting from a primary electrode surface from entering the secondary gap 8 and shorting the electrodes 8*a*, 8*b*.

If one arc gap 8 is approximately 0.003 inches and the other arc gap 9 is approximately 0.040 inches, it is possible to have the argon gas pressure in the chamber 6 sufficiently low that the 0.003 inch gap 8 will fall on the portion 3 of the curve of FIG. 1, for example at approximately P5. A typical argon pressure at the gaps 8, 9 may be about 3 mm. of Hg. For that same argon pressure the 0.040 inch gap 9 will fall on the part of the curve that represents a lower breakdown voltage, for instance in the region between the points P2 and P4.

During normal functioning of the arrester an overvoltage surge at conductor L will cause the primary or 0.040 inch gap to fire because of its lower breakdown voltage. The secondary 0.003 inch gap, because of its higher breakdown voltage, will not fire. However, if the chamber 6 becomes vented to atmosphere whereby atmosphere replaces the argon at both gaps 8, 9, the smaller or 0.003 inch gap 8 will fire because the pressure has increased substantially and the gas has been replaced by air at atmospheric pressure. Thus, the 0.003 inch gap is now represented by a point P6 on broken line curve 7 in FIG. 1 whereas the 0.040 inch gap will be represented by P7 on the broken line curve. The broken line curve 7 roughly represents a plot of breakdown voltage as a function of the mathematical product pd for air and the Kovar electrodes, previously described. The 0.003 inch gap, now an air gap, will have a breakdown voltage of about 600 to 750 volts, suitable for back-up protection for a telephone line that is connected at L.

A 0.003 inch air gap is likely to short circuit itself between the electrode surfaces 8*a*, 8*b* under surge conditions. This is desirable as the surge will ground the telephone line through the electrodes and indicate a line fault which needs to be corrected.

Figure 3:
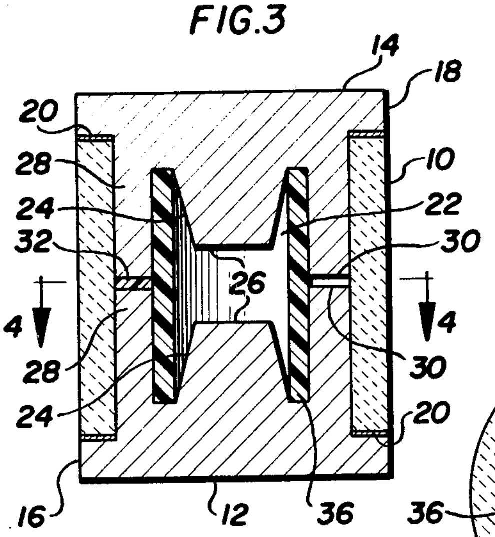
FIG. 3 is a sectional view taken through the center line of a gas tube constructed in accordance with and embodying the present invention.
Figure 4:
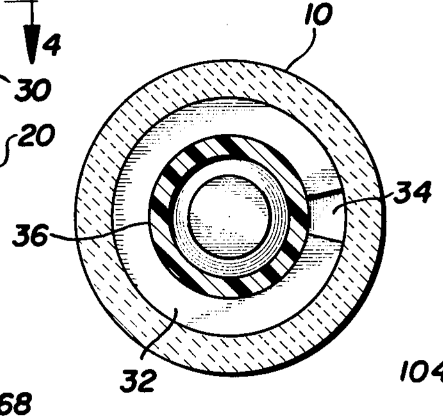
FIG. 4 is a sectional view taken along line 4—4 of FIG. 3.

Referring now to FIGS. 3 and 4, there is shown another form of surge arrester having a primary arc gap and a much smaller secondary arc gap. More particularly, the arrester comprises a cylindrical ceramic tube 10 having opposed electrodes 12, 14 secured thereto. The electrodes 12, 14 may have annular end flanges 16, 18 which are brazed or otherwise sealed to the end surfaces 20, 20 of the ceramic tube 10. The electrodes 12, 14 and the ceramic tube 10 define a chamber 22 for containing the gas to which the primary and secondary arc gaps are exposed.

The electrodes 12, 14 are of the same construction and each includes first plateaus 24, 24 of frusto-conical configuration and which surrounds the longitudinal axis of the tube 10. The plateaus 24, 24 have a first pair of flat opposed electrode surfaces 26, 26 which define the primary arc gap of about 0.040 inches. Radially outwardly of the first plateaus 24, 24 are rims or second plateaus 28, 28, one on each electrode, and which surround the first plateaus. The second plateaus 28, 28 have opposed flat electrode surfaces 30, 30 which define the secondary arc gap of the arrester. The surfaces 30, 30 are preferably about 0.003 inches apart. A dielectric spacer 32 of the C-washer style and 0.003 inches thick is interposed between the annular surfaces 30, 30 to establish the gap spacing. The washer 32 has a substantial arcuate cutout 34 leaving an uninsulated space between the surfaces 30, 30 corresponding to the arcuate extent of the cutout 34. A tubular insulator 36 of plastic or other suitable dielectric material surrounds the plateaus 24, 24 and extends from the base of one plateau 24 to the base of the other. The insulating tube 36 provides isolation that prevents material sputtering from a primary electrode surface from being deposited at and shorting the secondary arc gap. The insulator 36 might also prevent cross arcing from a plateau 24 to the rim or plateau 28 of the opposite electrode in some embodiments of the invention. Thus, the tube 36 is intended to provide isolation between the dual arc gaps while at the same time allowing each arc gap to be exposed to the gas within the tube. For this purpose the plastic tube 36 has a somewhat loose fit in that it may be capable of a slight amount of axial movement.

One of the electrodes 12, 14 is connected to the line to be protected while the other electrode is connected to ground. The primary and secondary arc gaps are coupled in parallel. The gas pressure in the tube and to which both gaps are exposed is such that in normal operation the breakdown voltage of the larger or primary arc gap is less than the breakdown voltage of the smaller or secondary arc gap. If the gas tube should become vented to atmosphere, the secondary arc gap will provide line protection through the air gap between the surfaces 30, 30 in the region of the arcuate cut out portion 34.

Figure 5:
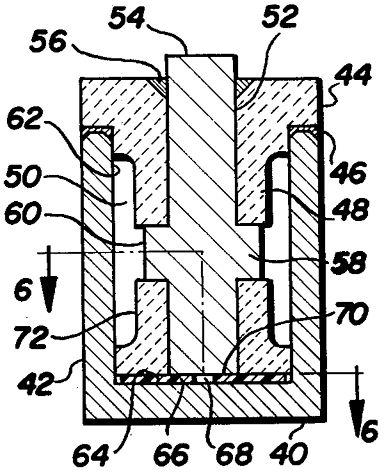
FIG. 5 is a sectional view through the center line of a further form of gas tube embodying the present invention.
Figure 6:
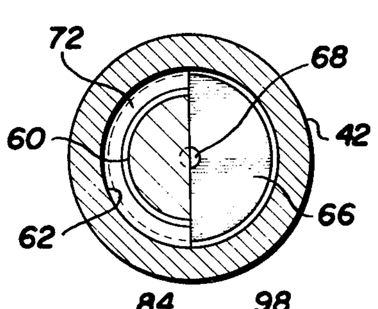
FIG. 6 is a sectional view taken along line 6—6 of FIG. 5.

Referring now to FIGS. 5 and 6, there is shown a further form of gas tube surge arrester that has a primary arc gap and a considerably smaller secondary arc gap. The arrester comprises a cup-shaped ground electrode 40 having a circular end or base and a cylindrical sidewall 42. At its open end the sidewall 42 has a ceramic insulator 44 secured thereto by any suitable metal-to-ceramic adhesive 46. The insulator 44 has a tubular rim portion 48 which lies within the cavity 50 of the electrode 40 and is spaced from the sidewall 42 thereof.

The insulator 44 has a central bore 52 for receiving an electrode 54 which is adapted to be connected to the telephone line to be protected via a tip of the electrode 54 which projects outwardly beyond the end of the ceramic insulator 44. The insulator 44 has a well at its end for receiving metal-to-ceramic adhesive 56. The adhesive 56 and the adhesive 46 may be of any suitable brazing composition or other suitable material for bonding the parts together so as to provide a vacuum tight seal for the chamber or cavity 50.

The electrode 54 has a diametrally enlarged intermediate portion 58 having an outer cylindrical surface 60 which is spaced from and surrounded by the inner cylindrical surface 62 of the sidewall 42. These two coaxial surfaces 60, 62 are preferably about 0.040 inches apart and together define a primary arc gap.

Seated on the inside surface 64 of the base of the ground electrode 40 is a dielectric plastic spacer 66 which is preferably about 0.003 inches thick although it might possibly be from 0.001 to 0.003 inches thick. The spacer 66 has a center hole 68. Positioned against spacer 66 is an end section of the line electrode 54. This end section may be of smaller diameter than the portion 58 and has an end surface 70 which cooperates with the surface 64 to define a secondary arc gap which, of course, will be substantially the thickness of the spacer 66. The secondary arc gap will fire through the center hole 68.

A ceramic insulator 72 is received within the cavity 50 and positioned between the intermediate portion 58 and the spacer 66. This insulator 72 has a central bore for receiving the line electrode 54. The insulator 72 serves to isolate the primary and secondary arc gaps and to prevent shorting of the secondary arc gap, as previously described.

The gas pressure in the chamber or cavity 50 is such that in normal operation both arc gaps are exposed to the same gas pressure and the breakdown voltage of the primary arc gap is less than the breakdown voltage of the secondary arc gap. Should the gas tube become vented to atmosphere the breakdown voltage of the secondary arc gap will be greater than that of the primary arc gap. Therefore, under these conditions there will be discharge to ground through the center hole 68 to provide line protection.

Figure 8:
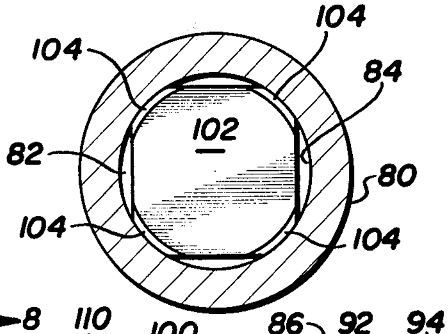
FIG. 7 is a sectional view taken through the center line of a three element gas tube embodying the present invention and FIG. 8 is a sectional view taken along line 8—8 of FIG. 7.
Figure 7:
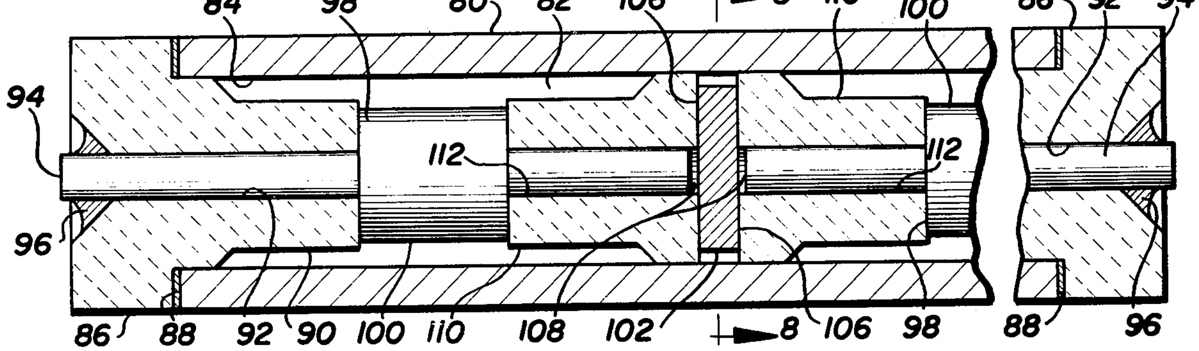

FIGS. 7 and 8 show a three electrode version of the present invention. The metallic ground electrode 80 is of hollow cylindrical form having a cavity or chamber 82 and an inner cylindrical wall surface 84. At each of the opposite ends of the electrode 80 are ceramic or glass insulators 86, 86 which are bonded to the end surfaces 88 of the electrode 80 by metal-to-ceramic brazing material or other suitable adhesive. The insulators 86, 86 are of like construction and each has a tubular rim portion 90 that lies within the cavity 82 and is spaced from the wall surface 84. The insulators 86 each have a central bore 92, each for receiving metallic line electrodes 94, 94. Each electrode 94 has a tip that projects beyond the end of the associated insulator 86 and is sealed in place by suitable adhesive or brazing material 96. Thus, both of the insulators 86, 86 and the line electrodes 94, 94 are sealed together and to the ground electrodes 80 so as to form a vacuum seal for the chamber 82.

Each line electrode 94 has a diametrally enlarged intermediate portion 98 having an outer cylindrical surface 100 that is coaxial with and is surrounded by the surface 84 to define a primary arc gap of about 0.040 inches.

Midway between the opposite ends of the tubular ground electrode 80 is a metal disc member 102 which departs from circular shape by having four segments cut therefrom to define substantially a four sided disc with arcuate corners 104, 104, 104, 104. The disc 102 is conveniently staked to the ground electrode 80 at the four corners 104 so as to be in firm electrically and mechanical contact therewith, whereby the disc 102 is part of the ground electrode 80. This staking operation is known and consists essentially of applying pressure to opposite sides of the disc 102 by tubular staking tools of conventional design which apply pressure to deform the metal locally and outwardly in the regions of the corner portions 104. As a result the disc 102 does not form a gas seal across the tube 80.

The disc 102 has opposite parallel surfaces 106, 106 that cooperate respectively with the end surfaces 108, 108 on the electrodes 94, 94 to provide secondary arc gaps for the purposes hereinbefore described. These secondary arc gaps may be about 0.003 inches, or possibly within the range of 0.001 inches to 0.003 inches. Between the intermediate portions 98 and the disc 102 are ceramic insulators 110, 110 for the same purpose as insulator 72 of FIG. 5. These insulators each have bores 112, 112 which receive the electrodes 94, 94 respectively.

As with previous embodiments the gas may be argon at a pressure of about 3 mm of Hg. and the electrodes may, for example, be of Kovar. In any event, the two primary and two secondary arc gaps are exposed to the same low pressure inert gas within the chamber 82. Thus, the discharge voltage of each primary arc gap is less than that of the secondary arc gaps unless and until the gas tube becomes vented to atmosphere. Since one line electrode 94 is connected to each side of a telephone line, each side of the line is protected through the gas tube because a surge at either line electrode 94 will be grounded via the ground electrode 80. For each side of the line, or each half of the gas tube, the primary and secondary arc gaps are coupled and parallel. Upon venting of the gas tube and a surge at each of the line electrodes, either can be grounded through the secondary arc gap at the central grounding disc 102.

The invention is claimed as follows:

1. A multiple arc gap spark gap device comprising means forming a chamber, a first pair of opposed electrode surfaces defining a primary arc gap in said chamber, a second pair of opposed electrode surfaces forming a secondary arc gap in said chamber, the width of said primary arc gap being greater than the width of said secondary arc gap, said primary and secondary arc gaps being electrically coupled in parallel, an ionizable gaseous medium in said chamber, the pressure of said gaseous medium and the widths of said gaps being such that the breakdown voltage of the primary arc gap is less than the breakdown voltage of the secondary arc gap, but the breakdown voltage of the secondary arc gap becomes less than the breakdown voltage of the primary arc gap upon loss of said gaseous medium from the chamber and replacement thereof in the chamber with air at atmospheric pressure.

2. A device according to claim 1 including insulator means providing an isolation of one arc gap from the other arc gap.

3. A device according to claim 1 in which the gaseous medium in the chamber is at a sub-atmospheric pressure.

4. A device according to claim 1 in which a pair of electrodes contain said first pair of opposed electrode surfaces and said second pair of opposed electrode surfaces.

5. A device according to claim 1 in which the means forming the chamber comprises a dielectric tube and electrodes sealed to the opposite ends of the tube, said electrodes having opposed first plateaus surrounding the axis of the tube end defining the first pair of opposed electrode surfaces, said electrodes also having opposed second plateaus defining the second pair of opposed electrode surfaces, the second plateaus being radially outwardly of the first plateaus.

6. A device according to claim 1 including a pair of electrodes containing said first pair of opposed surfaces and said second pair of opposed surfaces, said first pair of opposed surfaces being disposed with one surface surrounding the other surface, one electrode of the pair of electrodes having an end surface that is one of said second surfaces, and said one electrode having a portion intermediate its ends that has the surrounded surface.

7. A device according to claim 6 in which the other electrode is a cup-shaped member and the second of the second surfaces is on the inside of the member.

8. A device according to claim 6 in which said other electrode is a tubular member and there is a third electrode aligned with said one electrode, the second of the second surfaces being axially intermediate the third electrode and said one electrode.

9. A multi arc gap surge arrester of the gas tube type comprising a first hollow electrode having an internal wall forming a boundary of a chamber, a second electrode within the hollow of said first electrode and having an external surface that cooperates with said internal wall surface to define a primary arc gap in said chamber, additional surfaces on said first and second electrodes respectively defining a secondary arc gap in said chamber that is smaller than the primary arc gap, said arc gaps being coupled in electrical parallel, and ionizable gas in said chamber, the breakdown voltage of the primary arc gap being less than that of the secondary arc gap, but wherein the breakdown voltage of the secondary arc gap becomes less than that of the primary arc gap when the two arc gaps are exposed to air at atmospheric pressure.

10. A multi arc gap surge arrester of the gas tube type comprising a cup-shaped first electrode having a base and a cylindrical sidewall extending from the base and forming a chamber with an open end, said sidewall having an interior cylindrical surface, a second electrode within said chamber and having an exterior cylindrical surface coaxial with said interior cylindrical surface to define a primary arc gap in said chamber, said second electrode having a portion thereof projecting from said chamber, means including said last-mentioned portion for sealing said open end, an end surface of said second electrode in said chamber and a surface of said base in said chamber defining a secondary arc gap that is smaller than the primary arc gap, and an ionizable gas in said chamber at sub-atmospheric pressure, said arc gaps being coupled in electrical parallel, the breakdown voltage of the primary arc gap being less than that of the secondary arc gap, but wherein the breakdown voltage of the secondary arc gap becomes less than that of the primary arc gap when the two arc gaps are exposed to air at atmospheric pressure.

11. A multi arc surge arrester of the gas tube type comprising a first electrode of tubular shape and having a cylindrical interior wall surface forming a chamber with open opposite ends, second and third electrodes within said chamber, said second and third electrodes being axially spaced and each having outer cylindrical surfaces coaxial with said interior wall surface to establish primary arc gaps in said chamber, a member intermediate said second and third electrodes and being secured to said first electrode in electrical contact therewith, said member having opposed surfaces cooperating respectively with end surfaces of the second and third electrodes to form secondary arc gaps in said chamber, each primary arc gap being coupled in electrical parallel with a secondary arc gap, said second and third electrodes having portions at opposite ends of said chamber, means including said portions for sealing said open opposite ends, and an ionizable gas in said chamber at sub-atmospheric pressure, the breakdown voltage of each primary arc gap being less than that of each secondary arc gap, but wherein the breakdown voltage of the secondary arc gaps becomes less than that of the primary arc gaps when each of the arc gaps is opposed to air at atmospheric pressure.

12. A multi arc gap surge arrester of the gas tube type comprising means forming a chamber, a first pair of opposed electrode surfaces defining a primary arc gap in said chamber, a second pair of electrode surfaces forming a secondary arc gap in said chamber, said primary and secondary arc gaps being electrically coupled in parallel, means external to the chamber for connecting the parallel coupled arc gaps in a circuit from a telephone line to ground, and an ionizable inert gaseous medium in said chamber, the breakdown voltage of the primary arc gap being less than the breakdown voltage of the secondary arc gap, but the breakdown voltage of the secondary arc gap being less than the breakdown voltage of the primary arc gap upon loss of said gaseous medium from the chamber and replacement thereof in the chamber with air at atmospheric pressure.

* * * * *

UNITED STATES PATENT AND TRADEMARK OFFICE

CERTIFICATE OF CORRECTION

PATENT NO. : 4,142,220

DATED : February 27, 1979

INVENTOR(S) : Paul S. Lundsgaard

It is certified that error appears in the above-identified patent and that said Letters Patent are hereby corrected as shown below:

In the abstract, line 5, change "gap" to --gaps--;

Column 7, line 19, change "multiple to --multi--;

Column 11, line 62, change "opposed" to --exposed--.

Signed and Sealed this

*Eighteenth* Day of *September 1979*

[SEAL]

*Attest:*

LUTRELLE F. PARKER

*Attesting Officer* *Acting Commissioner of Patents and Trademarks*